United States Patent
Lanard et al.

(10) Patent No.: US 12,011,987 B2
(45) Date of Patent: Jun. 18, 2024

(54) COOLING MODULE HAVING A SACRIFICIAL REGION FOR AN ELECTRIC MOTOR VEHICLE

(71) Applicant: Valeo Systemes Thermiques, Le Mesnil Saint-Denis (FR)

(72) Inventors: Jean-Louis Lanard, Le Mesnil Saint Denis (FR); Amrid Mammeri, Le Mesnil Saint Denis (FR); Kamel Azzouz, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 169 days.

(21) Appl. No.: 17/439,183

(22) PCT Filed: Mar. 12, 2020

(86) PCT No.: PCT/FR2020/050511
§ 371 (c)(1),
(2) Date: Sep. 14, 2021

(87) PCT Pub. No.: WO2020/188190
PCT Pub. Date: Sep. 24, 2020

(65) Prior Publication Data
US 2022/0153127 A1    May 19, 2022

(30) Foreign Application Priority Data
Mar. 15, 2019    (FR) ........................................ 1902675

(51) Int. Cl.
*B60K 11/00*    (2006.01)
*B60K 11/04*    (2006.01)

(52) U.S. Cl.
CPC .................................. *B60K 11/04* (2013.01)

(58) Field of Classification Search
CPC ................................ B60K 11/04; B60K 11/08
(Continued)

(56) References Cited

U.S. PATENT DOCUMENTS

| 2,733,044 A | * | 1/1956 | Danel | ........................ | F03B 1/04 |
| | | | | | 239/590.5 |
| 4,279,569 A | * | 7/1981 | Harloff | ..................... | F01D 1/14 |
| | | | | | 415/53.3 |

(Continued)

FOREIGN PATENT DOCUMENTS

| CN | 105431319 A | 3/2016 |
| CN | 106573532 A | 4/2017 |

(Continued)

OTHER PUBLICATIONS

International Search Report and Written Opinion issued in corresponding International Application No. PCT/FR2020/050511, dated Jun. 8, 2020 (12 pages).

(Continued)

*Primary Examiner* — Hau V Phan
(74) *Attorney, Agent, or Firm* — Osha Bergman Watanabe & Burton LLP (57) ABSTRACT

A cooling module (22) for a motor vehicle (10) with an electric motor (12) comprises a housing (24) defining a longitudinal channel opening at two ends (24a; 24b) of the housing (24), at least one heat exchanger (301-304) arranged in the channel, and at least one tangential-flow turbomachine (28) capable of creating an air flow in the channel. The housing (24) has a sacrificial region (40) intended to be deformed and/or to break preferentially in the event of an impact, the sacrificial region preferably being located in the vicinity of an end (24a; 24b) of the housing (24).

10 Claims, 6 Drawing Sheets

(58) Field of Classification Search
USPC .......................................................... 180/68.1
See application file for complete search history.

(56) References Cited

U.S. PATENT DOCUMENTS

| | | | | |
|---|---|---|---|---|
| 5,094,586 | A * | 3/1992 | Takada | F04D 29/444 |
| | | | | 415/53.3 |
| 5,735,338 | A * | 4/1998 | Chevroulet | B60H 1/0005 |
| | | | | 219/202 |
| 6,086,324 | A * | 7/2000 | Ikeda | F04D 17/04 |
| | | | | 415/119 |
| 6,554,563 | B2 * | 4/2003 | Noe | F01D 5/189 |
| | | | | 415/115 |
| 7,011,360 | B2 * | 3/2006 | Lanard | B60R 19/12 |
| | | | | 293/115 |
| 7,497,287 | B2 * | 3/2009 | Kunikata | B60K 11/04 |
| | | | | 180/68.1 |
| 7,517,185 | B2 * | 4/2009 | Hirakawa | F24F 1/0025 |
| | | | | 415/119 |
| 8,052,374 | B2 * | 11/2011 | Ricketts | A01F 12/444 |
| | | | | 415/203 |
| 8,221,064 | B2 * | 7/2012 | Ricketts | A01F 12/444 |
| | | | | 415/203 |
| 9,573,437 | B2 * | 2/2017 | Osaka | B60H 1/0005 |
| 9,945,578 | B2 * | 4/2018 | Vanberg | F24F 11/52 |
| 10,155,438 | B2 * | 12/2018 | Vacca | B60K 11/08 |
| 10,208,983 | B2 * | 2/2019 | Hjorth | E21B 43/26 |
| 10,416,008 | B2 * | 9/2019 | Vanberg | F01P 1/06 |
| 11,142,059 | B2 * | 10/2021 | Vacca | B62D 25/085 |
| 2005/0022965 | A1 * | 2/2005 | Mori | F28F 9/002 |
| | | | | 165/76 |
| 2005/0023057 | A1 | 2/2005 | Maeda et al. | |
| 2011/0146320 | A1 * | 6/2011 | Tomiyama | B60H 1/3208 |
| | | | | 62/296 |
| 2012/0024611 | A1 * | 2/2012 | Ajisaka | B60K 11/08 |
| | | | | 180/68.1 |
| 2013/0022432 | A1 * | 1/2013 | Spitler | F01P 3/18 |
| | | | | 165/41 |
| 2014/0132033 | A1 * | 5/2014 | Townson | B62D 27/06 |
| | | | | 296/193.1 |
| 2017/0043659 | A1 * | 2/2017 | Vacca | B62D 25/085 |

FOREIGN PATENT DOCUMENTS

| | | |
|---|---|---|
| WO | 2014/195636 A1 | 12/2014 |
| WO | 2016/016549 A1 | 2/2016 |
| WO | 2017/036869 A1 | 3/2017 |

OTHER PUBLICATIONS

Office Action Issued in Corresponding CN Application No. 202080021127.5, dated Feb. 16, 2023. (6 Pages).

* cited by examiner

COOLING MODULE HAVING A SACRIFICIAL REGION FOR AN ELECTRIC MOTOR VEHICLE

TECHNICAL FIELD

The invention concerns a cooling module for an electric motor vehicle, comprising a tangential-flow turbomachine. The invention also concerns an electric motor vehicle equipped with such a cooling module.

PRIOR ART

A cooling module (or heat-exchange module) of a motor vehicle conventionally comprises at least one heat exchanger and a ventilation device which is designed to generate an air flow in contact with the at least one heat exchanger. The ventilation device thus allows for example creation of an air flow in contact with the heat exchanger when the vehicle is stationary.

In motor vehicles with conventional internal combustion engines, the at least one heat exchanger has a substantially square form, the ventilation device then being a propeller fan of diameter substantially equal to the side of the square formed by the heat exchanger.

Conventionally, the heat exchanger is then placed opposite at least two cooling openings formed in the front face of the body of the motor vehicle. A first cooling opening is situated above the bumper, while a second opening is situated below the bumper. Such a configuration is preferred since the internal combustion engine must also be supplied with air, the engine air intake being conventionally situated in the passage of the air flow through the upper cooling opening.

However, electric vehicles are preferably equipped solely with cooling openings situated below the bumper, further preferably a single cooling opening situated below the bumper.

In fact the electric motor does not need an air supply. The reduction in the number of cooling openings also allows an improvement in the aerodynamic characteristics of the electric vehicle. This is also reflected by a better autonomy and a higher top speed of the motor vehicle.

Under these conditions, the use of a conventional cooling module appears unsatisfactory. Indeed, a majority of heat exchangers are no longer correctly cooled by the air flow coming solely through the lower cooling opening(s).

An object of the invention is to propose a cooling module for an electric motor vehicle without at least some of the above-mentioned drawbacks.

An additional object of the invention is to propose a robust cooling module, aimed in particular at better protection of the heat exchangers in the event of frontal impact.

DISCLOSURE OF THE INVENTION

To this end, the object of the invention is a cooling module for a motor vehicle with an electric motor, comprising:
- a casing defining a longitudinal channel opening out at two ends of the casing,
- at least one heat exchanger arranged in the channel, and
- at least one tangential-flow turbomachine capable of creating an air flow in the channel,
wherein the casing has a sacrificial zone intended to deform and/to break preferentially, in the event of an impact, the sacrificial zone being preferably in the vicinity of one end of the casing.

The tangential-flow turbomachine allows creation of an air flow through the heat exchangers with a better efficiency than if a propeller fan were used, in particular in the case in which the at least one heat exchanger has a limited height with respect to its length.

Also, the presence of the sacrificial zone intended to deform or to break preferentially ensures the dissipation of energy in the event of an impact. Thus, the casing is damaged locally in the region of the sacrificial zone, in particular in the event of a frontal impact, advantageously before the occurrence of any damage to a heat exchanger and/or to the tangential-flow turbomachine.

As a preference, the cooling module comprises one or more of the following features, considered alone or in combination:
- the sacrificial zone forms a longitudinal portion of the casing;
- the sacrificial zone has a smaller thickness than the rest of the casing;
- the sacrificial zone is bent;
- the sacrificial zone is made of a different material than the rest of the casing;
- the height of each of the at least one heat exchanger is less than or equal to 350 mm, the cooling module preferably having a height between 70 mm and 300 mm;
- the cooling module comprises at least two heat exchangers;
- each of the heat exchangers has a width between 20 mm and 700 mm;
- the heat exchangers are arranged one after another in the channel;
- the cooling module has a longitudinal dimension between 12 mm and 140 mm;
- the cooling module comprises between four and seven heat exchangers, preferably four or five heat exchangers;
- said at least one tangential-flow turbomachine comprises a tangential impeller, having a substantially cylindrical shape, provided with at least one stage of blades;
- the tangential impeller or tangential impellers is/are arranged such that the height of the tangential impeller or tangential impellers extends parallel to the lateral direction of the heat exchangers;
- the height of the at least one tangential impeller is substantially equal to the width of at least one heat exchanger, preferably to the width of all the heat exchangers;
- the at least one tangential impeller has a diameter between 35 mm and 200 mm and/or the at least one tangential-flow turbomachine comprises a motor able to turn the tangential impeller about its axis, at a speed between 200 rpm and 14,000 rpm.

According to another aspect, a motor vehicle with an electric motor is described, comprising a body, a bumper and a cooling module as described above in all its combinations, the body defining at least one cooling opening arranged below the bumper, the cooling module being arranged opposite the at least one cooling opening, preferably such that the sacrificial zone is oriented toward the cooling opening.

BRIEF DESCRIPTION OF THE DRAWINGS

Other characteristics, details and advantages of the invention will become apparent upon reading the detailed description below, and upon analyzing the appended drawings, in which.

DESCRIPTION OF EMBODIMENTS

In the remainder of the description, elements that are identical or perform identical functions bear the same reference sign. In the present description, for the sake of conciseness, these elements are not described in detail within each embodiment. Rather, only the differences between the embodiment variants are described in detail.

Figure 1:
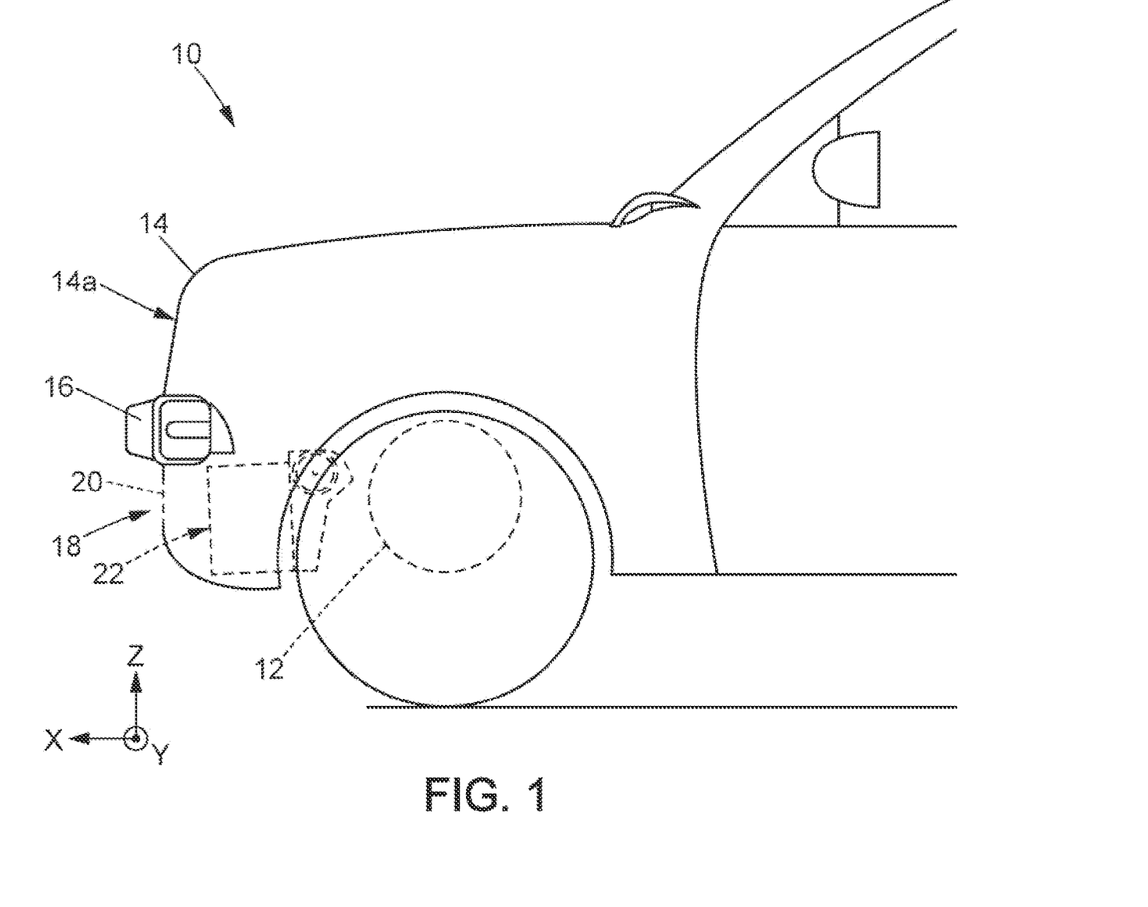
FIG. 1 depicts schematically the front part of a motor vehicle with an electric motor, viewed from the side.

FIG. 1 illustrates schematically the front part of a motor vehicle 10 with an electric motor 12. The vehicle 10 comprises in particular a body 14 and a bumper 16 carried by a chassis (not shown) of the motor vehicle 10. The body 14 defines a cooling opening 18, i.e. an opening through the body 14. Here there is only one cooling opening 18. This cooling opening 18 is situated in the lower part of the front face 14a of the body 14. In the example illustrated, the cooling opening 18 is situated below the bumper 16. A grille 20 may be arranged in the cooling opening 18 to prevent projectiles from being able to pass through the cooling opening 18. A cooling module 22 is arranged opposite the cooling opening 18. The grille 20 in particular provides protection for the cooling module 22.

Figure 2:
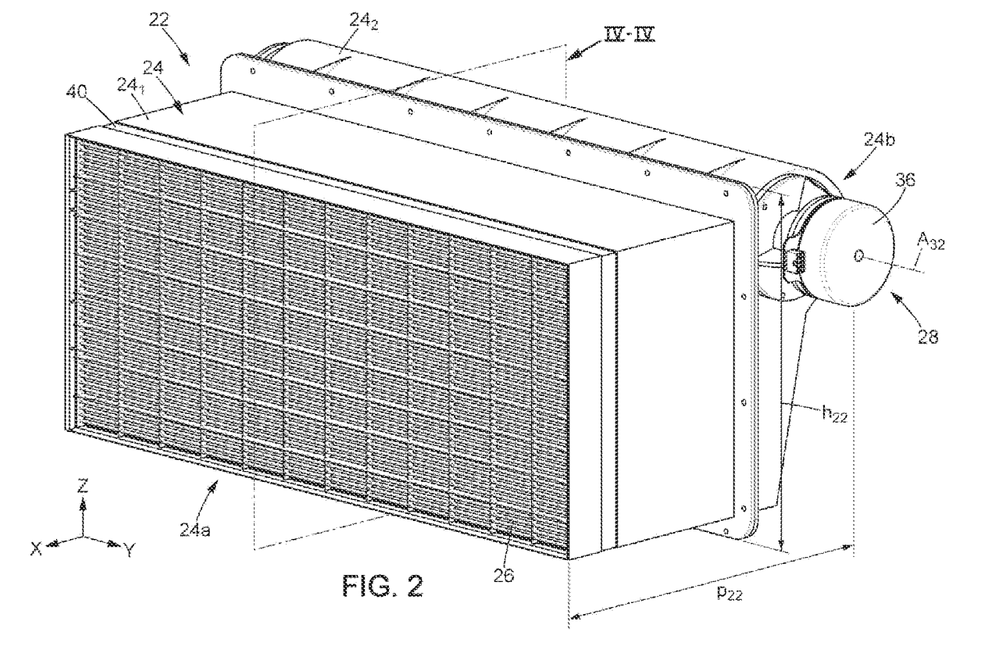
FIG. 2 is a schematic perspective view of a cooling module which may be used in the motor vehicle from FIG. 1.

The cooling module 22 is more clearly visible on FIG. 2.

As illustrated on FIG. 2, the cooling module 22 essentially comprises a casing 24 forming an internal channel between two opposite ends 24a, 24b. The end 24a is intended to be arranged opposite the cooling opening 18. The opening of the casing 24 at this front end 24a of the channel may be partially blocked by means of a mesh 26.

The casing 24 is here made in two parts $24_1$, $24_2$ which are fixed together by any means accessible to the person skilled in the art. In this case, the two parts $24_1$, $24_2$ are screwed together at a collar. The front part $24_1$ has substantially the form of a rectangular parallelepiped open on two opposite faces. The rear part $24_2$ has a substantially more complex form. This rear part $24_2$ here in particular forms the volute of the tangential-flow turbomachine 28.

Figure 3:
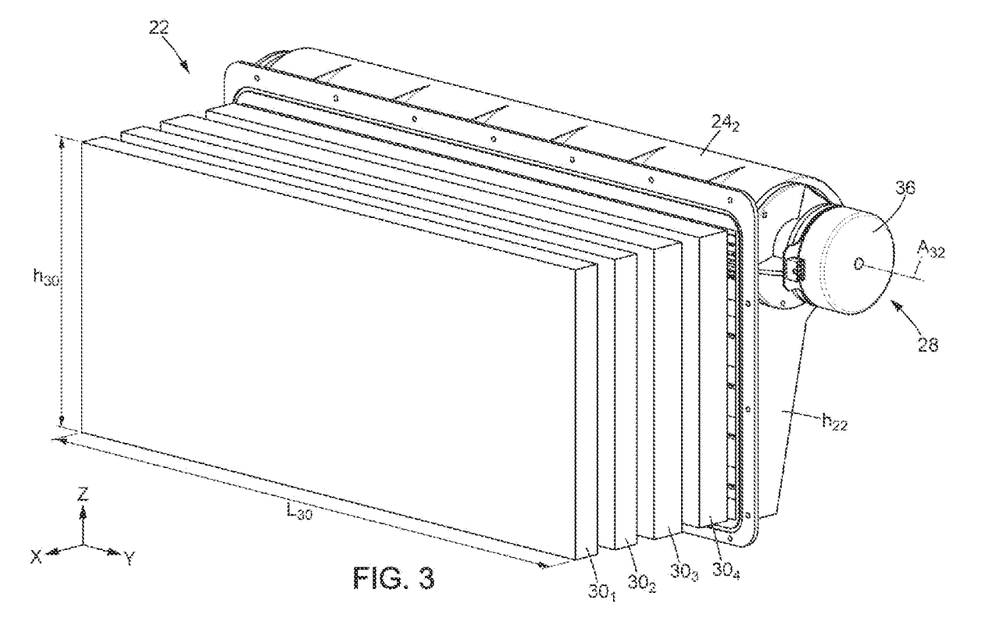
FIG. 3 is a view similar to FIG. 2 of the same cooling module, in which part of the casing has been removed.

FIG. 3 illustrates the cooling device 22 in which the front part $24_1$ of the casing 24 has been removed. FIG. 3 thus illustrates the presence of a plurality of heat exchangers $30_1$-$30_4$ in the conduit formed inside the casing 24. Here, four heat exchangers $30_1$-$30_4$ are provided. Of course, this number of heat exchangers is nonlimiting. Rather, a different number of heat exchangers may be provided in the casing, in particular at least one heat exchanger, and preferably between four and seven heat exchangers, even more preferably four or five heat exchangers. The heat exchangers $30_1$-$30_4$ are illustrated schematically in FIG. 3 in the form of substantially rectangular plates. In practice and notably, the heat exchangers $30_1$-$30_4$ have in particular a height $h_{30}$, measured in a substantially vertical direction, which is less than or equal to 350 mm. The heat exchangers $30_1$-$30_4$ are thus particularly well dimensioned for being in contact with an air flow passing through the cooling opening 18.

In the example illustrated in FIG. 3, all heat exchangers $30_1$-$30_4$ are identical and all have a same height $h_{30}$. In the case where the heat exchangers $30_1$-$30_4$ have different heights, it is preferred that all these heights are less than or equal to 350 mm.

Preferably, the height $h_{30}$ of the heat exchangers $30_1$-$30_4$ is between 70 mm and 300 mm. This indeed ensures a satisfactory performance of the heat exchangers $30_1$-$30_4$ while retaining a reduced size of these heat exchangers, the size being particularly suitable for the use of a single cooling opening 18. Here again, in the case where the heat exchangers $30_1$-$30_4$ have different heights, it is preferred that the height of each heat exchanger $30_1$-$30_4$ is between 70 and 300 mm.

Even more preferably, the cooling module 22 has a height $h_{22}$ between 70 mm and 300 mm. It is understood that the height $h_{30}$ of the heat exchangers $30_1$-$30_4$ is always substantially less than the height $h_{22}$ of the cooling module 22.

To compensate for the relatively low height of the heat exchangers $30_1$-$30_4$, these may be relatively numerous, in particular up to four or five heat exchangers $30_1$-$30_4$, even up to seven heat exchangers. Indeed, to achieve performance levels comparable to those of conventional cooling modules, the number of heat exchangers may be doubled by arranging them in pairs, in series, in the circuit of the fluid passing through them. In other words, a heat exchanger of a conventional cooling module may correspond to two heat exchangers or more in the cooling module 22, through which the same fluid passes. In this case in particular it is useful if the heat exchangers are arranged one behind the other in the conduit formed by the casing 24. The order of the heat exchangers may be determined as a function of a temperature of the fluid passing through them, or a distance of the heat exchanger concerned from a heat source in the circuit of fluid passing through them. Thus the heat exchangers through which a hot fluid flows are arranged further from the end 24a of the casing 24, intended to be arranged just behind the cooling opening 18, than heat exchangers through which a colder fluid flows.

The arrangement of heat exchangers $30_1$-$30_4$ one behind the other in the axial direction X of the cooling module 22 may also limit the size of the cooling module 22 in its two other lateral and vertical dimensions. This preferably, the depth $p_{22}$ of the cooling module 22 is between 12 mm and 140 mm. Also, the width $L_{30}$ of the heat exchangers $30_1$-$30_4$ or of each heat exchanger $30_1$-$30_4$ may lie between 12 mm and 140 mm.

In addition, because of the shape of the heat exchangers $30_1$-$30_4$, a tangential-flow turbomachine 28 is preferred. In fact a propeller fan would be unable to create a substantially uniform air flow in contact with the heat exchangers $30_1$-$30_4$, in particular over substantially the entire length of these heat exchangers $30_1$-$30_4$, a length measured in the lateral direction Y.

Here, the tangential-flow turbomachine 28 comprises a turbine 32 (or tangential impeller). The turbine 32 has a substantially cylindrical form, as is shown particularly clearly on FIG. 5. The turbine 32 comprises several stages of blades 34 (or vanes), in this case sixteen stages of blades 34. Naturally, this number of stages of blades 34 is not limiting, and the turbine 32 may more generally comprise at least one stage of blades 34.

Figure 5:
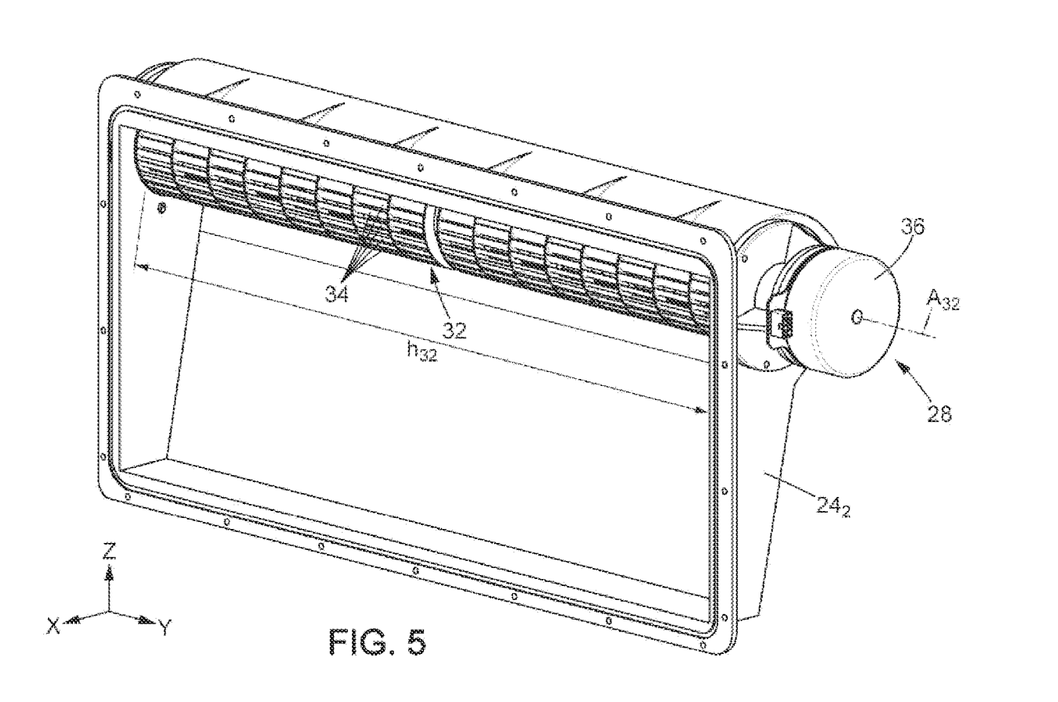
FIG. 5 is a schematic view of a detail of the cooling module from FIG. 2.
Figure 6:
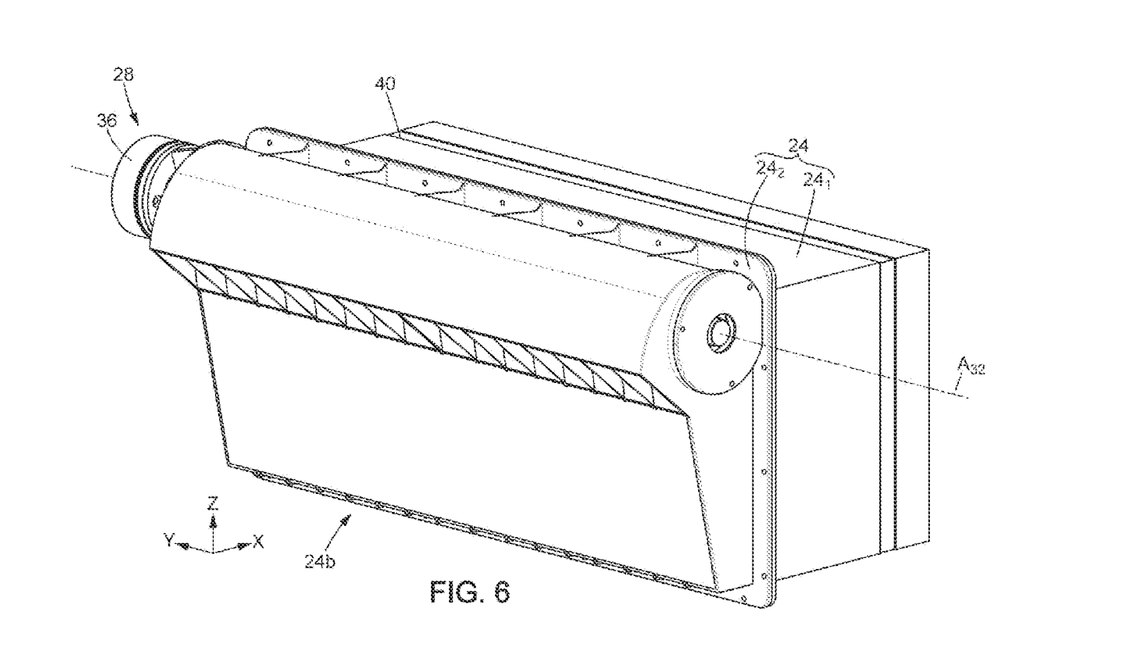
FIG. 6 is a perspective view of the cooling module from FIG. 2 in an opposite orientation.

Each stage of blades 34 comprises a same number of blades 34 evenly distributed angularly around the rotational axis $A_{32}$ of the turbine 32. Advantageously, the stages of blades 34 are angularly offset such that the blades 34 are not aligned, preferably such that no blade 34 is aligned with another blade 34 of another stage of blades 34 in the lateral direction Y of the cooling module 22. This then avoids the blades 34 of the turbine 32 generating noise, particularly because of the fact that all the blades 32 would be working in synchrony. By offsetting the blades 34, it is possible rather to ensure that the blades 34 work in separate groups, which makes it possible to reduce the noise generated. This gives a tangential-flow turbomachine 28 in which the sound nuisance can be limited. This is particularly important in the case of a cooling module 22 for a motor vehicle with electric motor, since an electric motor is known to be less noisy than an internal combustion engine. In addition, the cooling module 22 is intended to be used also when the electric motor has stopped, in particular when the batteries are being recharged. The noise of the tangential-flow turbomachine 28 may then be considered a nuisance by users.

The blades 34 of each stage may in particular be offset by half the spacing between the blades 34, with respect to each of the two neighboring stages. Thus, a first half of the stages of blades 34 have blades 34 which are aligned with one another and which are offset by half the angular spacing between the blades 34 relative to the blades 34 of the other half of the stages of blades 34. The noise generated by the rotating turbine 22 can thus theoretically be substantially halved, which corresponds to a reduction of the order of 3 dB in the noise emitted.

Alternatively, the angular offset of the blades 34 between two adjacent stages of blades 34 corresponds to the thickness of a blade 34.

Alternatively or in addition, the spacing between the blades 34 may be divided into substantially as many intermediate positions as there are stages of blades 34. Thus, the blades 34 of the various stages of blades 34 may be offset step-by-step in the same angular direction, along a longitudinal direction of the turbine 32. The blades 34 of the various stages therefore extend substantially in a helix along the various stages of blades 34. In this particular case, all the blades 34 of all the stages of blades 34 are offset with respect to all the blades 34 of all the other stages of blades 34. This allows an even greater reduction in the noise generated by the rotating turbine 32.

Of course, numerous other configurations are accessible to those skilled in the art, allowing all the blades 34 of all the stages of blades 34 to be offset relative to all the other blades 34 of all the other stages of blades 34. In particular, based on the preceding configuration in which the blades 34 of the various stages 34 extend in the manner of the helix, it is possible to swap the various stages around, without altering their orientation about the longitudinal axis of the turbine 32.

The turbomachine 28 also comprises a motor 36 (or gear motor) able to drive the turbine 32 in rotation about its rotational axis $A_{32}$. Advantageously, the rotational axis $A_{32}$ of the turbine 32, which corresponds to the height direction of the turbine 32, is oriented substantially parallel to the lateral direction Y of the heat exchangers $30_1$-$30_4$. The turbomachine 28 is thus able to create a substantially constant air flow over the entire width of a same heat exchanger $30_1$-$30_4$. In order to optimize the air flow created, the height $h_{32}$ of the turbine 32 is substantially equal to the width $L_{30}$ of the heat exchangers $30_1$-$30_4$.

The motor 36 is for example able to drive the turbine 32 in rotation at a speed between 200 rpm and 14,000 rpm. This allows in particular a limitation of the noise generated by the turbomachine 28.

The diameter $D_{32}$ of the turbine 32 is for example between 35 mm and 200 mm as limits. The turbomachine 28 is thus compact.

Figure 4:
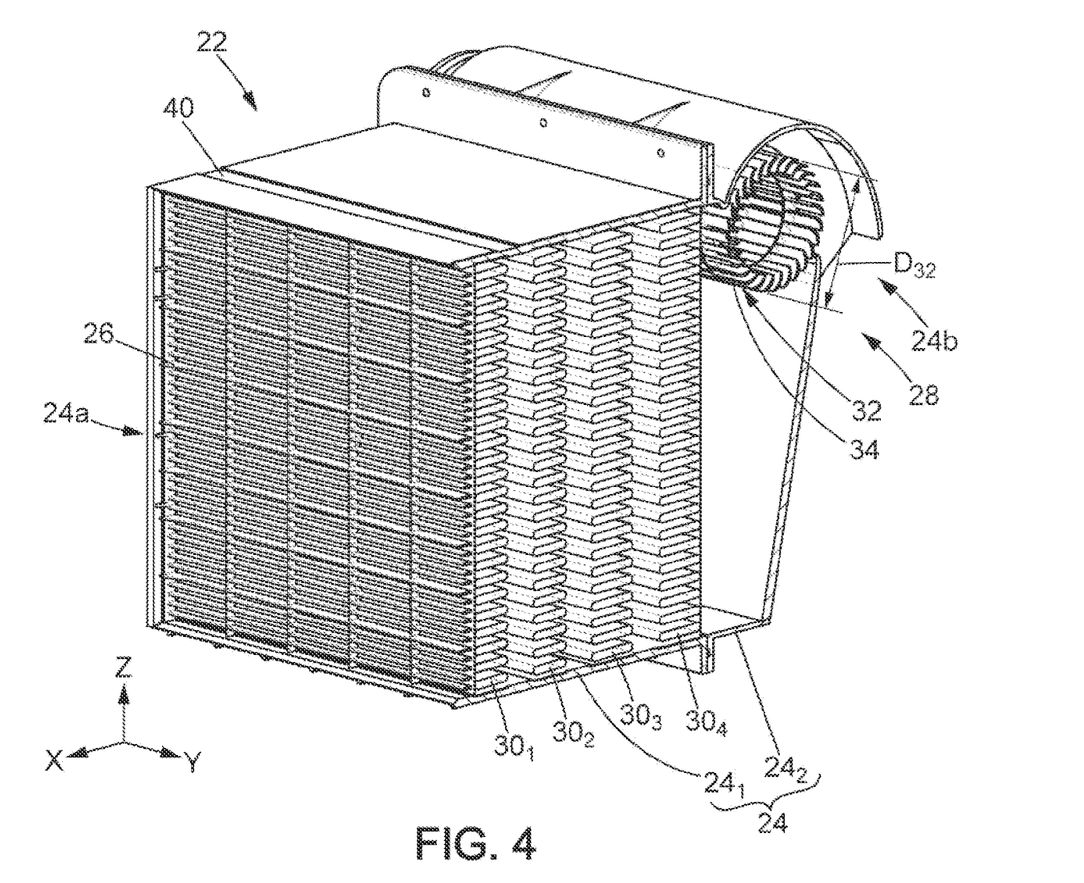
FIG. 4 is an extract view along plane IV-IV of the cooling module from FIG. 2.

As already stated, the rear part $24_2$ of the casing 24 forms the volute of the turbomachine 28, as can be seen more particularly from FIGS. 4 and 5. In addition, the cross-section of the conduit formed in the casing 24 is significantly greater at the end 24a than at its opposite end 24b. This allows the turbomachine 28 to create an air flow in the casing 24 which has a specific pressure, in order to facilitate the passage of said air flow through the conduit through the casing 24, despite the presence of the heat exchangers $30_1$-$30_4$.

Also, notably, the casing 24 of the cooling module 22 has here a sacrificial zone 40 intended to deform and/or to break preferentially, in the event of an impact, in particular in the event of a frontal impact. The sacrificial zone 40 is preferably in the vicinity of a front end 24a, intended to be closest to the bumper 16 and/or the cooling opening 18 of the motor vehicle 10, when the cooling module 22 is mounted in the vehicle 10. In particular, the sacrificial zone 40 is preferably arranged longitudinally between the end 24a and the heat exchanger $30_1$ arranged closest to this end 24a. Thus, the deformation and/or breaking of the sacrificial zone 40 is advantageously realized before any damage to the heat exchangers $30_1$-$30_4$ and the turbomachine 28.

In the example illustrated, the sacrificial zone 40 is in the form of a longitudinal portion of the casing 24, for example in the form of a strip. To promote the deformation of and/or damage to the sacrificial zone 40, the latter may in particular:

have a smaller thickness than the rest of the casing 24; and/or be bent, in particular in one or more transverse directions; and/or be made of a different material than the rest of the casing 24, in particular of a material more ductile than the rest of the casing 24.

The invention is not limited to the exemplary embodiments described with respect to the figures, and further embodiments will be clearly apparent to a person skilled in the art. In particular, the various examples can be combined, provided they are not contradictory.

Figure 7A:
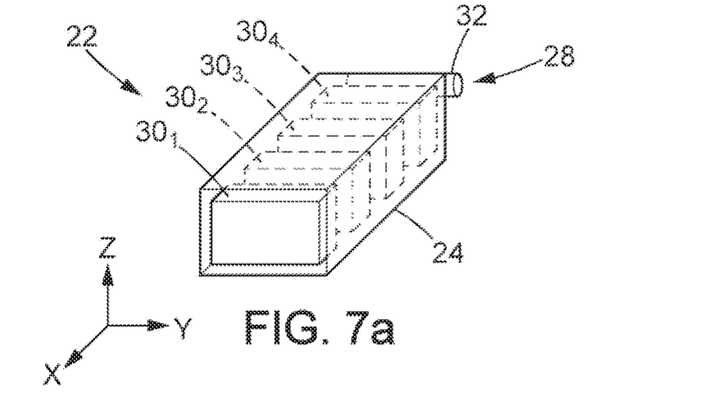
FIG. 7a illustrates schematically a first variant of the cooling module.
Figure 7B:
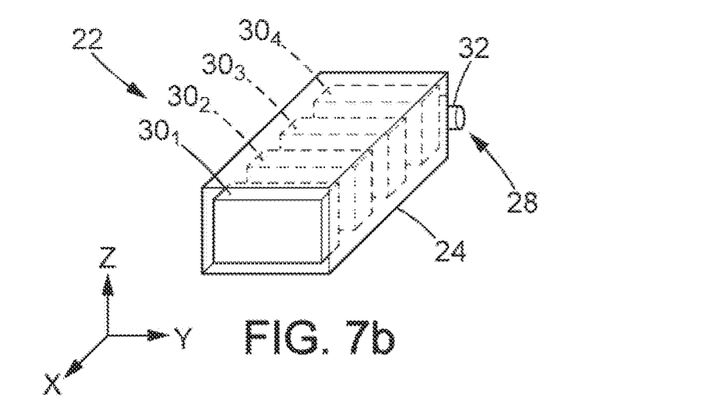
FIG. 7b illustrates schematically a second variant of the cooling module.
Figure 7C:
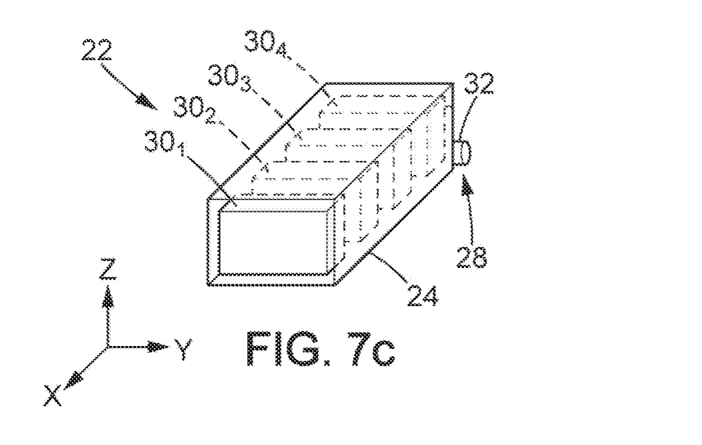
FIG. 7c illustrates schematically a third variant of the cooling module.

For example, in the example illustrated above and illustrated schematically in FIG. 7a, the turbomachine 28 is in a top position, in particular in the upper third of the casing 24, preferably in the upper quarter of the casing 24. This in particular allows protection of the turbomachine 28 in the case of submersion, and/or limits the space taken up by the cooling module 22 in its bottom portion. Rather, a bottom position of the turbomachine 28, illustrated in FIG. 7c, in particular in the lower third of the casing 24, limits the space taken up by the cooling module 22 in its top portion. Alternatively, the turbomachine 28 can be in a median position, illustrated in FIG. 7b, in particular in the middle third of the height of the casing 24, for example for reasons of integration of the cooling module 24 in its environment.

Figure 8:
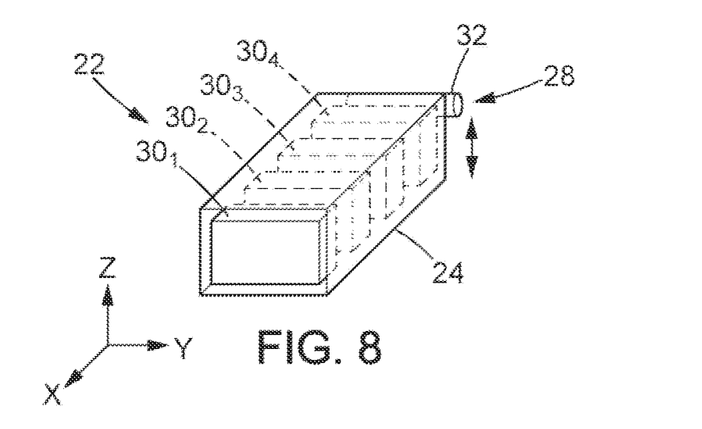
FIG. 8 illustrates schematically a fourth variant of the cooling module.

Also, according to the example illustrated in FIG. 8, the turbomachine 28, and more particularly the turbine 32 of this turbomachine 28, is movable relative to the heat exchangers $30_1$-$30_4$ in the height direction of these heat exchangers $30_1$-$30_4$. Such a configuration may for example allow precise temporal management of the cooling of some of the heat exchangers $30_1$-$30_4$.

Also, in the examples illustrated, the turbomachine 28 functions by suction, i.e. it draws in ambient air and conducts it into contact with the various heat exchangers $30_1$-$30_4$. Alternatively however, the turbomachine 28 operates by blowing, blowing the air towards the different heat exchangers $30_1$-$30_4$.

Also, whereas in the example described with reference to FIGS. 2 to 6, the turbomachine is situated in the casing of the cooling module, the turbomachine may be arranged outside the casing at one end or another end of this casing, depending on whether or not it functions by suction or blowing.

In FIGS. 7a-7c and 8, the sacrificial zone 40 is not illustrated for the sake of clarity of the figures. However, this sacrificial zone 40 can also be present on the casing 24 of the cooling modules illustrated in these figures.

The invention claimed is:

1. A cooling module for a motor vehicle with an electric motor, comprising:
  a casing defining a longitudinal channel opening out at two ends of the casing;
  at least one heat exchanger arranged in the channel; and
  at least one tangential-flow turbomachine capable of creating an air flow in the channel;
  wherein the casing has a sacrificial zone configured to deform and break preferentially, in the event of an impact, the sacrificial zone being in the vicinity of one end of the casing proximate the at least one heat exchanger.

2. The cooling module as claimed in claim 1, wherein the sacrificial zone forms a longitudinal portion of the casing.

3. The cooling module as claimed in claim 1, wherein the sacrificial zone has a smaller thickness than the rest of the casing.

4. The cooling module as claimed in claim 1, wherein the sacrificial zone is bent.

5. The cooling module as claimed in claim 1, wherein the sacrificial zone is made of a different material than the rest of the casing.

6. The cooling module as claimed in claim 1, wherein the height of the at least one heat exchanger is less than or equal to 350 mm, the cooling module having a height between 70 mm and 300 mm.

7. The cooling module as claimed in claim 1, wherein the at least one heat exchanger has a width between 20 mm and 700 mm.

8. The cooling module as claimed in claim 1 comprising at least two heat exchangers, said heat exchangers being arranged one after another in the channel.

9. The cooling module as claimed in claim 1, having a longitudinal dimension between 12 mm and 140 mm.

10. A motor vehicle with an electric motor, comprising:
  a body;
  a bumper and the cooling module as claimed in claim 1, the body defining at least one cooling opening arranged below the bumper, the cooling module being arranged opposite the at least one cooling opening such that the sacrificial zone is oriented toward the cooling opening proximate the at least one heat exchanger.

* * * * *